3,506,875
PEN-TRACKING SYSTEM IN CATHODE-RAY TUBE DISPLAY EQUIPMENT
Shigeru Watanabe, Hachioji-shi, Chikafusa Hirano, Kodaira-shi, and Takeo Miura, Kokubunji-shi, Japan, assignors to Hitachi, Ltd., Tokyo-to, Japan
Filed Apr. 30, 1968, Ser. No. 725,346
Claims priority, application Japan, June 28, 1967, 42/40,991
Int. Cl. H01j 29/46
U.S. Cl. 315—12       21 Claims

ABSTRACT OF THE DISCLOSURE

A system for tracking a light-pen on the face of a cathode-ray tube through control of beam deflection including a storage arrangement for storing the coordinate value of the light-pen position, deflection control means for generating two sets of tracking signals for deflecting the electron beam along transverse lines through the previously detected position of the light-pen from points outside of the circular sensitive field thereof, means for detecting the coordinates of points of entry of the beam into said sensitive field, means for determining the position of the light-pen from the detected coordinates and means for renewing the value of the light-pen position in the storage arrangement from the newly determined value.

---

This invention relates to a pen-tracking system, and more particularly to a pen-tracking system in combination with cathode-ray tube display equipment in which a photosensor called a light pen is adapted to be tracked.

As is well known, cathode-ray tube display equipment of this type has been developed for the purpose of deriving information of hand-written characters and figures for application to a memory of a digital computer. In this equipment, when the operator mainpulates the light-pen to move it on the display screen of a cathode-ray tube, such as if he "writes" characters or figures on the screen, the electron beam tracks the movement of said light-pen and thus the coordinates of the position of said light-pen are determined and can be successively stored in the memory of a digital computer for later use.

For tracking the light-pen, for instance in known systems, the digital tracking cross is used. This tracking pattern is constituted of thirty-two stops drawn by an electron beam on the display screen of the cathode-ray tube. These spots brighten in a definite sequence according to a predetermined program. By placing the light-pen on the tracking pattern, an output pulse appears at the light-pen at each time a spot located within the sensitive field thereof brightens. By computing said output pulses and by properly operating upon them under logical processing through the computer, the existing co-ordinates of the light-pen can be detected. Also, the center of the tracking pattern can be moved to the center position of the sensitive field of the light-pen.

The abovementioned tracking procedure is executed usually under the control of a program of the digital computer. For this reason, the pen-tracking system using such a tracking pattern as the digital tracking cross needs a long acquisition time at the computer. This apparently is inefficient. To save such acquisition time, several attempts have hitherto been made to provide an improved system, for example, W. D. Stratton, "Investigation of an Analog Technique to Decrease Pen-Tracking Time in Computer Displays," SARE Report III–L, No. 13, Massachusetts Institute of Technology Project MAC discloses a suggested improvement. These attempts, however, require development of new and special parts or components. Accordingly, it will take a long time to make these systems available on a commercial basis.

A principal object of this invention is to provide a pen-tracking system according to which the conventional light-pen which has previously been developed can be utilized.

Another object of the invention is to provide a pen-tracking system which can be embodied with comparatively simple electronic circuit components.

A further object of the invention is to provide a pen-tracking system operable without using any complex operational program.

A still further object of the invention is to provide a pen-tracking system by which the occupied time at a computer is remarkably reduced.

These, as well as additional objects and advantages of the present invention will become more apparent from the following description when taken in connection with the accompanying drawing, in which.

Figure 1:
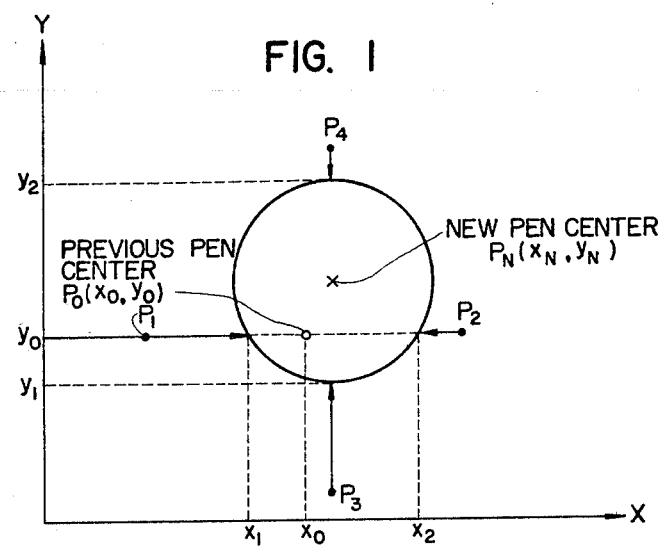
FIGURE 1 is a graphical diagram explaining the principle of operation of a pen-tracking system according to the present invention.

Now referring to the drawings, the invention will be explained in detail.

FIGURE 1 is an illustration explaining the principle of operation of a pen-tracking system according to this invention. In the drawing, the quadrature axis represents the X-axis (horizontal axis) on the display screen of a cathode-ray tube (hereinafter simply referred to as CRT), and the ordinate axis represents the Y-axis (vertical axis). Points $P_O$ and $P_N$ represent the coordinates $(X_O, Y_O)$ of the previous pen center, before movement thereof, and the coordinates $(X_N, Y_N)$ of the pen center at present, after movement thereof, respectively. Assume now that the light-pen moves from point $P_O$ to point $P_N$. A circle in the drawing shows the boundary of the sensitive field of the light-pen at the new pen center. When a bright spot or a bright line enters within this circle, the light-pen produces and output.

Points $P_1$ and $P_2$ are selected so that they will be located on a line which is parallel to the X-axis, passing through the previous pen center $P_O$, and further $P_1$ and $P_2$ will be located at a definite distance from said center. Assuming that bright spots (tracking patterns) by the electron beam in the CRT are controlled so that they may move rectilinearly from said two points $P_1$ and $P_2$ toward said pen center $P_O$. Needless to say, starting points $P_1$ and $P_2$ are required to be located at points outside the sensitive field (represented by a circle in the drawing) of the light-pen at the new pen position $P_N$.

Until the bright spot having started from the point $P_1$ and $P_2$ enters the sensitive field of the light-pen, the pen does not produce any output, but produces the output immediately when said bright spot enters the field. Let the coordinates of the bright spot at this moment be $X_1$ and $X_2$ respectively. Then, the X-coordinate $X_N$ of the new pen center is given by:

$$X_N = \frac{1}{2}(X_1 + X_2) \quad (1)$$

Likewise, the Y-coordinate of the new pen center $$Y_N = \frac{1}{2}(Y_1 + Y_2) \quad (2)$$

where $Y_1$ and $Y_2$ are the coordinates of the bright spots at the moment said bright spots which have been started from $P_3$ and $P_4$ respectively enter the sensitive field of the light-pen. Thus, if the coordinates $X_1$, $X_2$, $Y_1$ and $Y_2$ can be determined using the previous pen center $P_O$, the coordinates $X_N$ and $Y_N$ of the new pen center can be found. The pen-tracking system of this invention depends upon this principle.

Figure 2:
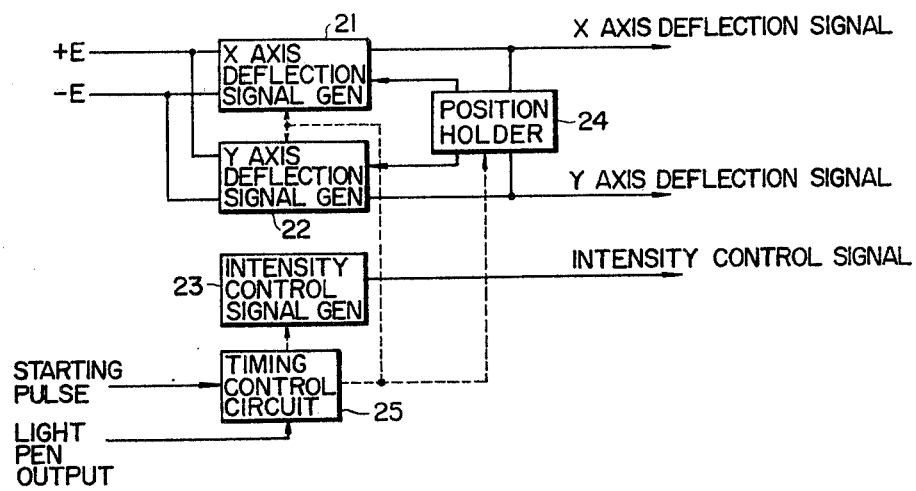
FIGURE 2 is a general block diagram illustrating the basic elements of a system according to the present invention.

FIGURE 2 briefly shows an embodiment of this invention in which the system is constituted of analog circuits. This basic system includes an X-axis deflection signal generator 21 and a Y-axis deflection signal generator 22, which produce the necessary deflection signals to guide the electron beam of the CRT along the tracking patterns, as described with reference to FIGURE 1. The system also includes an electron beam intensity control signal generator 23, which controls the intensity of the electron beam of the CRT, and a position holder 24, which is used for computing and holding the coordinates of the pen center ($P_O$ or $P_N$ in FIGURE 1). A timing control circuit 25 is provided for controlling the operation timing for the circuits 21, 22, 23, and 24. This control circuit is actuated by the starting pulse applied at the beginning of each tracking cycle, and by the output signal from the light-pen. The timing signals controlled by the control signal 25 are applied to said circuits 21, 22, 23, and 24, as will be described in greater detail hereinafter.

Since said starting pulse circuit is composed in the same manner as in the usual pen-tracking system, and the construction of the light-pen itself is well known, details thereof are not described in this specification.

To the X-axis deflection signal generator 21 and to the Y-axis deflection signal generator 22 are applied both a positive voltage $+E$ and a negative voltage $-E$ of direct current as reference voltages. These reference voltages are used for determining distances between point $P_O$ and each of points $P_1$, $P_2$, $P_3$ and $P_4$. Therefore, the X-axis deflection signal generator 21 and the Y-axis deflection signal generator 22 are controlled so that they generate an X-axis deflection signal and a Y-axis deflection signal, respectively, which will deflect the beam along the tracking patterns from the previous pen center ($P_O$) coordinates to an extent determined by the reference voltages $+E$ and $-E$, and the positive holder 24 determines from the signals received from the light-pen the coordinates of the new light-pen position.

Figure 3A:
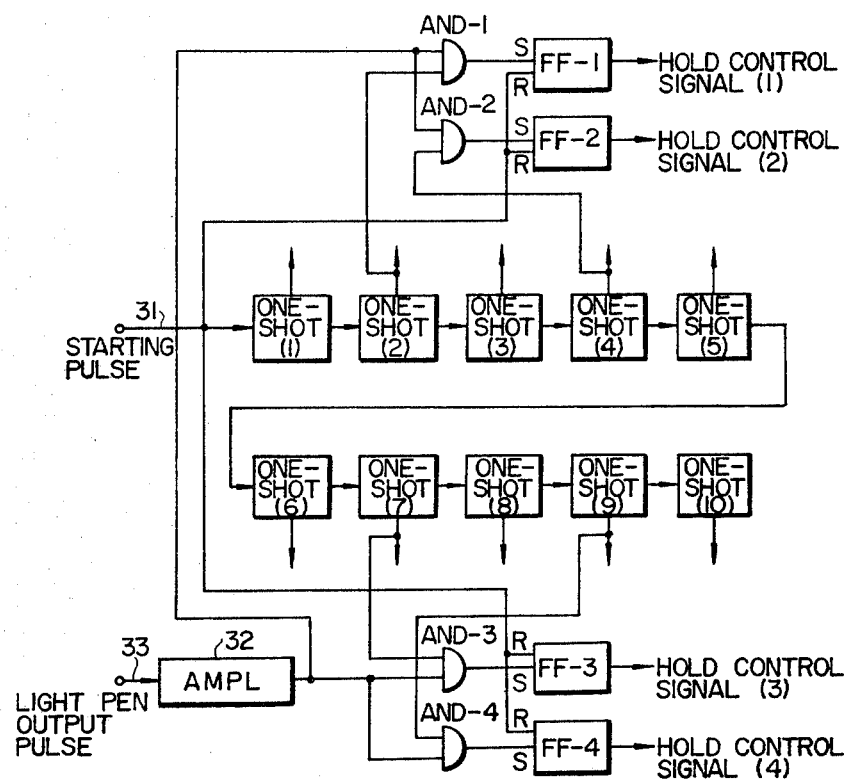
FIGURES 3a through 3c are schematic block diagrams illustrating one specific embodiment of the system of FIGURE 2.
Figure 3B:
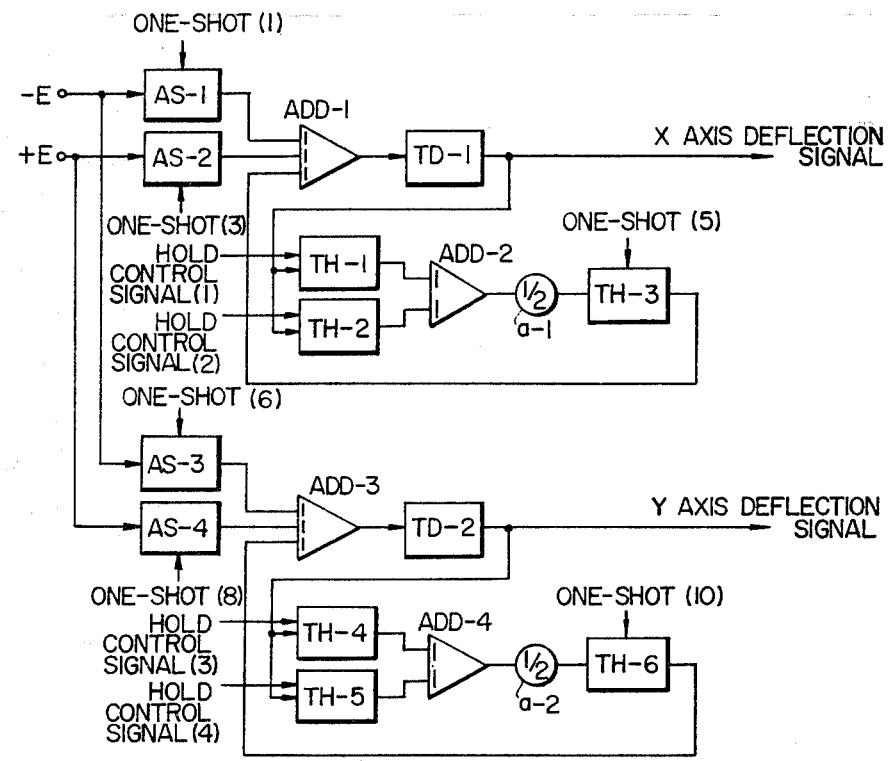
Figure 3C:
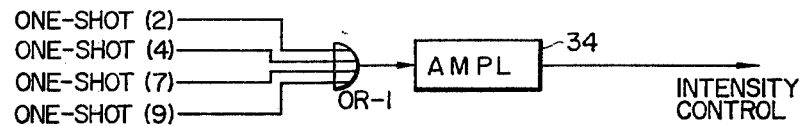

Such pen-tracking system can be embodied with analog circuits as shown in FIGURES 3a through 3c. Figure 3a shows the timing control circuit 25 as provided in FIGURE 2. The X-axis deflection signal generator 21, the Y-axis deflection signal generator 22 and the position holder 24 are shown in FIGURE 3b. The intensity control signal generator 23 as provided in FIGURE 2 is shown in FIGURE 3c.

The timing control circuit, as shown in FIGURE 3a, is provided with ten monostable multivibrators, One-Shot (1) through (10). These multivibrators are connected in cascade so that each of them will be set by the output delivered from the preceding multivibrator when the preceding multivibrator resets. Thus, this cascade of multivibrators acts as a delay chain providing a plurality of equally spaced timing pulses.

Figure 4:
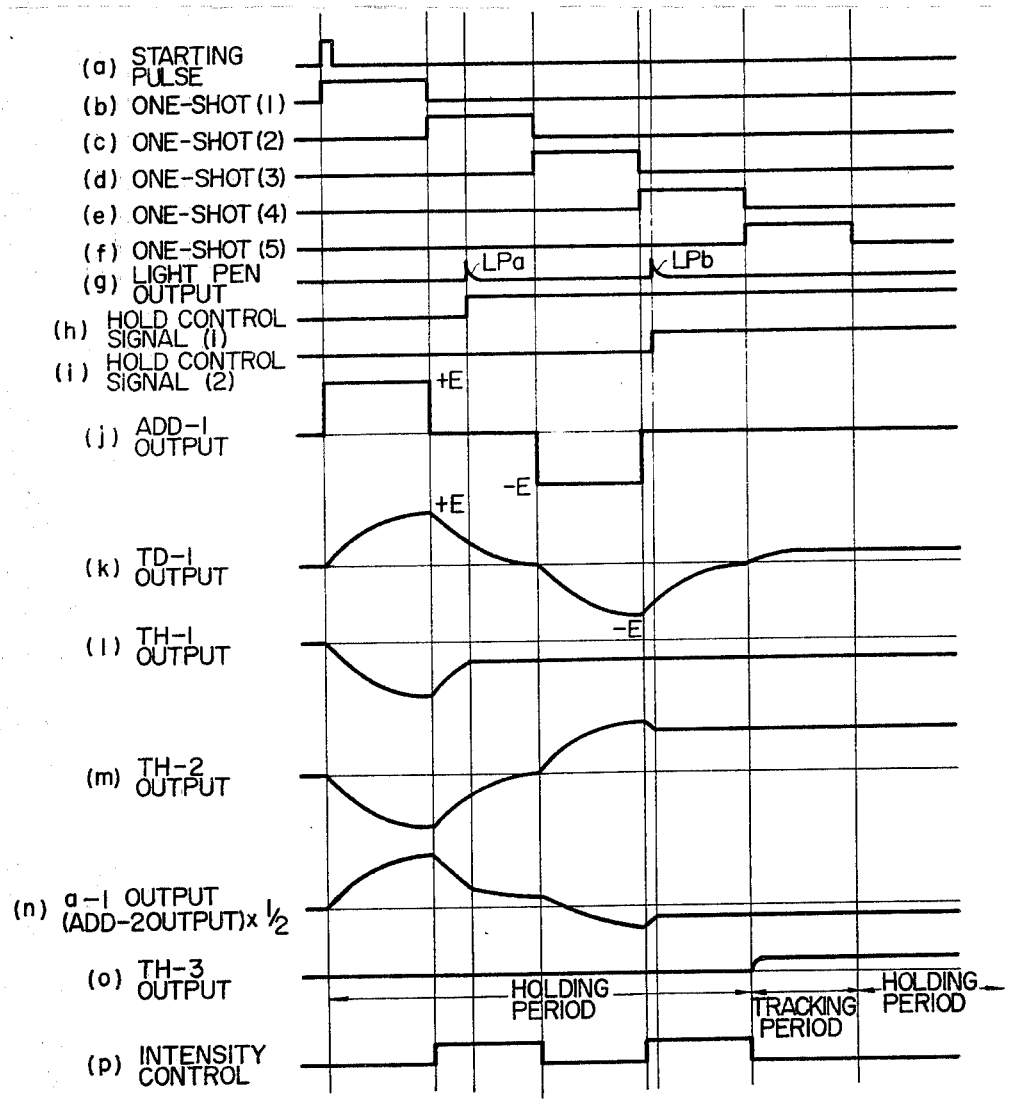
FIGURE 4 is a time chart for explaining the operation of the embodiment shown in FIGURES 3a through 3c.

FIGURE 4 shows waveforms at certain points in the circuits shown in FIGURES 3a through 3c. For simplification, only the sections relating to the X-axis deflection signal are shown therein. In FIGURE 4, line $a$ shows a starting pulse which is to be applied to the multivibrator One-Shot (1) in FIGURE 3a, and lines ($b$) through ($f$) show the output waveforms of the multivibrators One-Shot (1) to (5), respectively. The output of each multivibrator is also delivered to each circuit as indicated in FIGURES 3b and 3c. For representing this, for instance, the denotation "One-shot (1)" etc. is provided at the proper terminals in said drawings.

The timing control circuit is further provided with a hold signal generator to control the position holder, as will be described in connection with FIGURE 3b. The hold signal generator has four flip-flop circuits FF1 through FF4 and four AND gates AND-1 through AND-4 used for on/off control of the set pulses for said flip-flops. The reset terminal R of each flip-flop is connected in common to the input terminal 31 for the start pulse. The terminal on one side of each AND gate is connected in common to the input terminal 33 for the output pulse of the light-pen, through an amplifier 32. The other terminals of the AND gates are connected, as shown in the drawing, to the output terminals of the multivibrators, One-Shot (2), (4), (7), and (9).

The X-axis deflection signal generator is comprised as seen in FIGURE 3b, of two analog switch circuits AS-1 and AS-2 connected to the negative reference voltage $-E$ and the positive reference voltage $+E$, respectively, a time delay circuit TD-1, such as the 1st order lag circuit, and an adder ADD-1 in which the output of said analog switch circuits, and the output of the position holder as mentioned later, are added together. The result of said addition is delivered to said time delay circuit TD-1. Similarly, the Y-axis deflection signal generator is also composed of the analog switch circuits AS-3 and AS-4, the adder ADD-3, and the time delay circuit TD-2.

The position holder 24 is provided for the X-axis deflection signal generator and the Y-axis deflection signal generator. Said position holder is composed of track-hold circuits TH-1 and TH-2 or TH-4 and TH-5 provided for selectively holding the output of the time delay circuit TD-1 or TD-2, an adder ADD-2 or ADD-4 for adding the outputs of the abovementioned circuits, a potentiometer $a$-1 or $a$-2 (potentiometer factor ½) connected to the output side of each adder, and further a track-hold circuit TH-3 or TH-6 which selectively holds the output of each potentiometer.

The intensity control signal generator is composed of an OR gate OR-1 connected to the abovementioned monostable multivibrators, One-Shot (2), (4), (7), and (9), and an amplifier 34 connected to said OR gate, as seen in FIGURE 3c.

Now relating to the X-axis control, the operation of the embodiment as illustrated in FIGURES 3a through 3c will be explained in FIGURE 3b, assume that every output of the track-hold circuit TH-3, and the analog switches AS-1 and AS-2 is zero. In this case, the X-axis deflection signal (i.e., the output of the time delay circuit TD-1) is also zero. The case of the Y-axis deflection signal is assumed to be the same as above. Accordingly, the electron beam in the CRT is not deflected at all. Therefore, the beam is directed toward the center point (origin) of the display screen. In this state, assume that the light-pen is brought to a point near the center of the display screen of the CRT (not shown), and the start pulse is applied to the input terminal 31 of the circuit in FIGURE 3a. This starting pulse is shown in line ($a$) of FIGURE 4.

The analog switches AS-1 and AS-2 (FIGURE 3b) are controlled by the outputs of the multivibrators One-Shot (1) and (3), respectively, to effect selective passage of the reference voltages $-E$ and $+E$ to the adder ADD-1. Therefore, at the output terminal of the adder ADD-1, an output having a waveform as shown in line (j) of FIGURE 4 is produced. The time delay circuit TD-1 (1st order lag, in this case) is actuated by the output of the adder ADD-1, to generate an output as shown in line (k) of FIGURE 4. This output is delivered as the X-axis deflection signal to the CRT. In this case, because the Y-axis deflection signal is still kept at zero, the electron beam in the CRT is reciprocated once in the horizontal direction from the center (i.e., origin) on the display screen to an outward point during operation of One-Shot (1) and back to the center during operation of One-Shot (2). The electron beam is then reciprocated outward in the opposite direction from center to a point during operation of One-Shot (3) and back to the center during the operation of One-Shot (4).

However, the intensity control circuit is, as shown in FIGURE 3c, energized only while the multivibrators One-Shot (2) and (4) are in operation, so far as the X-axis control is concerned. Accordingly, said intensity control circuit generates the output of the waveform as in line (p) of FIGURE 4, indicating the generation of a trace on the CRT only during the return portion of the deflection signal from the two outward points. Therefore, while the multivibrators One-Shot (1) and (3) are in operation, no bright line appears on the display screen of the CRT. Thus, two tracking patterns moving toward the origin from the outward points (corresponding to points $P_1$ and $P_2$ in FIGURE 1) located at a definite distance in the positive and the negative directions along the X-axis are presented in succession on the display screen of the CRT.

During the period when the first tracking pattern is generated and at the instant the bright spot forming said pattern on the CRT enters the sensitive field of the light-pen, a pulse signal, as shown by $LP_a$ in line (g) of FIGURE 4. This output pulse $LP_a$ from the light-pen is applied to the input terminal 33 of FIGURE 3a, from which it is then applied in common to the AND gates AND-1, AND-2, and AND-3, AND-4. But in this case, since only the multivibrator One-Shot (2) is in operation, only the AND gate AND-1 is opened whereby the flip-flop FF-1 is set. All of the flip-flops are reset at the beginning of each tracking cycle by receiving the starting pulse, and are subsequently set again by the operation of the respective AND gate. As the result, the hold control signal (1) as in line (h) of FIGURE 4 is generated by the flip-flop FF-1, and is applied to the track-hold circuit TH-1 (FIGURE 3b).

Thus, the track-hold circuit TH-1 operates, and the value of the X-axis deflection signal at the instant the output pulse $LP_a$ is produced in the light-pen is held during the tracking cycle, namely, during the period ended by application of the next start pulse, as seen in line (l) of FIGURE 4.

During generation of the second X-axis tracking pattern and if the spot forming said pattern on the CRT enters the sensitive field of the light-pen, a pulse signal shown by $LP_b$ in line (g) of FIGURE 4 is generated in the light-pen. This pulse, similar to the case mentioned above, is applied to the AND gates AND-1 through AND-4. But in this case, since the multivibrator One-Shot (4) is in operation, the flip-flop FF-2 is set, and the hold control signal (2) as shown in line (i) of FIGURE 4 is generated. Consequently, the track-hold circuit TH-2 operates, and the value of the X-axis deflection signal at the moment the output pulse $LP_b$ is generated in the light-pen, is held, as seen in line (m) of FIGURE 4.

Both outputs of the track-hold circuit TH-1 and TH-2, which represent the values $X_1$ and $X_2$ discussed in connection with FIGURE 1, are added by the adder ADD-2, and applied to the track-hold circuit TH-3 through the potentiometer a-1. FIGURE 4, line (n), shows this output of the potentiometer a-1, which displays a complicated variation as in the drawing, until the multivibrator One-Shot (4) ends its operation. But, finally said output becomes stable at the value:

½ × (value held by track-hold circuit TH-1 +value held by track-hold circuit TH-2)

This signal value represents the completion of the computation of the Equation 1.

The track-hold circuit TH-3, unlike the track-hold circuit TH-1 or TH-2, is so constituted that, during the period the multivibrator One-Shot (5) is in operation, TH-3 follows the input thereto, but during other periods, it holds the final value of said trailing period. Accordingly, as shown in line (o) of FIGURE 4, the final value of the potentiometer a-1 is held simultaneously with the completion of the operation of the multivibrator One-Shot (5). This holding value is applied to the adder ADD-1, and then extracted as the X-axis deflection signal, through the time delay circuit TD-1. Thus, the electron beam center in the CRT tracks the light-pen center. The output value of the track-hold circuit TH-3 representing the X-coordinate of the light-pen center can be sent into the memory of the computer after analog-to-digital conversion done through the conventional process.

The Y-axis deflection signal generator as shown in the lower half part of FIGURE 3b, and the position holder for said generator are controlled by the monostable multivibrator One-Shot (6) which is started simultaneously with the completion of the operation of the multivibrator One-Shot (5), and the succeeding multivibrators One-Shot (7) through (10). Details thereof are not described here, however, in this case, the Y-axis deflection signal follows the center position of the light-pen. Only one factor exists which differs from the case of X-axis control is as follows. In the case of Y-axis control, the tracking pattern does not appear on both the right and left sides of the center point of the display screen of the CRT, but appears on the upper and lower sides of the point on the X-coordinate, corresponding to the center position determined by said steps.

It will easily be understood that, when the light-pen is moved, the coordinate values held by the track-hold circuits TH-3 and TH-6 are renewed continuously based on the point occupied by the light-pen before the move. Thus, the tracking operation is performed in the same manner as described above.

The light-pen center may be visibly indicated on the CRT by the use of the bright spot in the following manner. During an appropriate period, e.g., during the operation period of the multivibrator One-Shot (10), the output of said multivibrator may be applied to the OR gate OR-1 in the intensity control circuit of FIGURE 3c. Thus, the electron beam center is moved visibly following the move of the pen.

The compositional elements of the circuit of FIGURES 3a through 3c are not special. Hence those skilled in the art can construct this circuit by the use of conventional electronic parts, applying conventional techniques based on this specification. Therefore this specification will contain no further details thereof.

Figure 5:
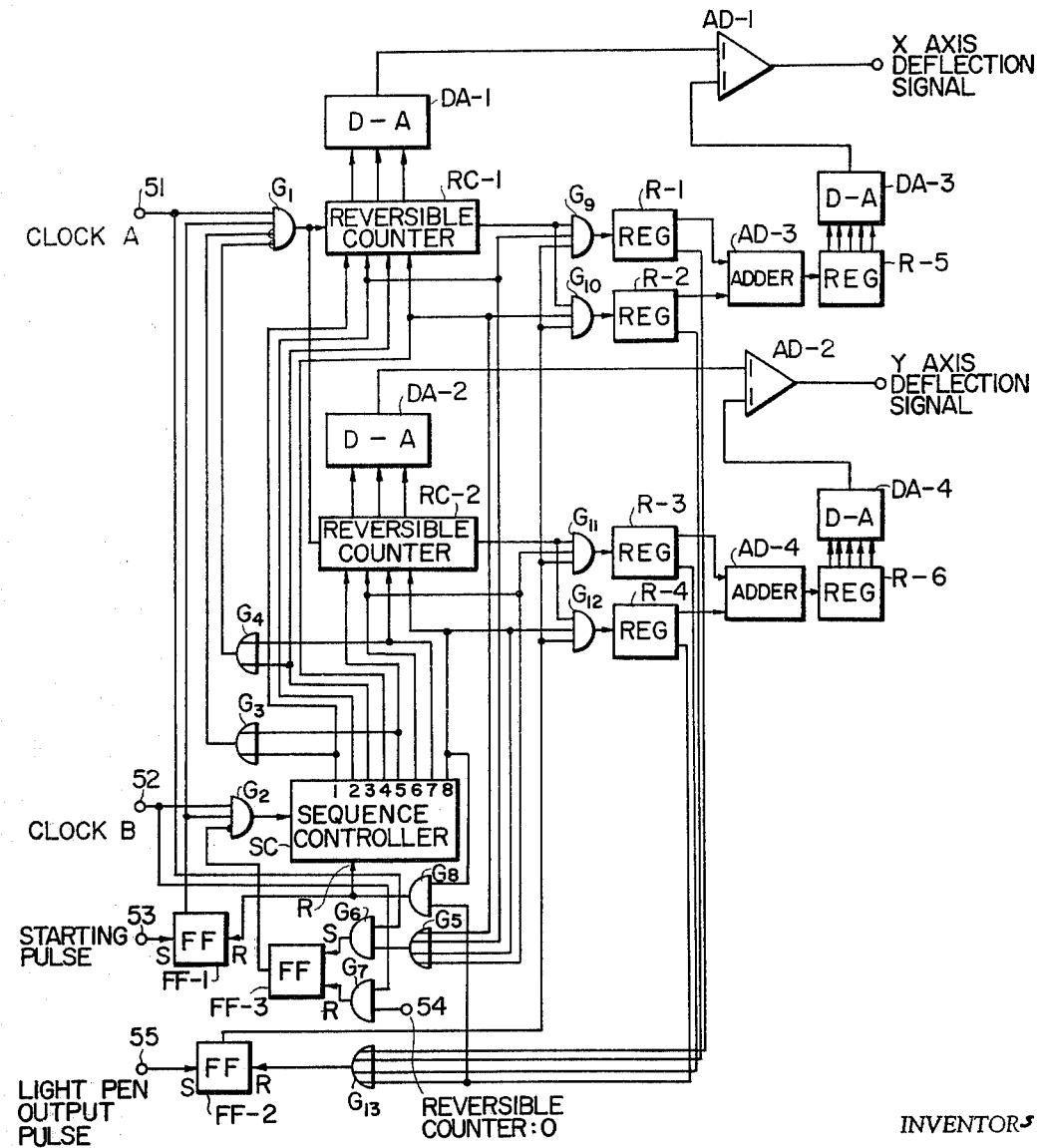
FIGURE 5 is a schematic diagram illustrating another embodiment of the present invention.
Figure 6:
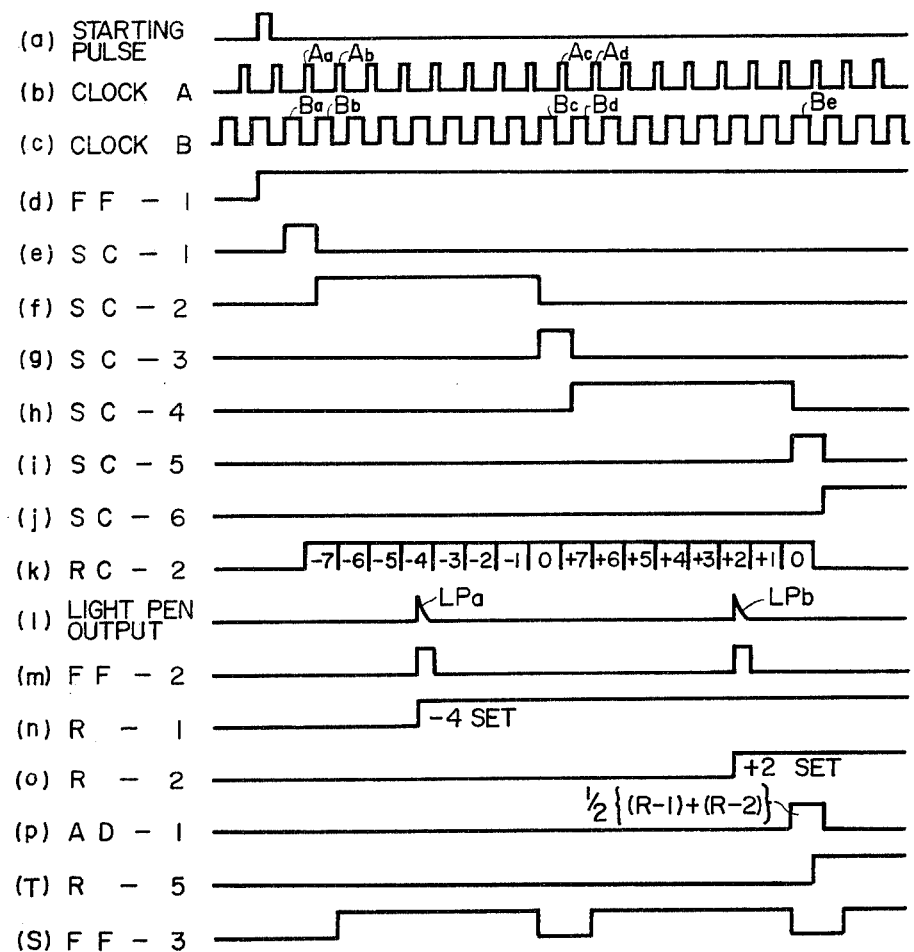
FIGURE 6 is a time chart for explaining the operation of the embodiment shown in FIGURE 5.

FIGURE 5 shows an embodiment of the system of this invention provided with digital circuits. Referring to the time chart as shown in FIGURE 6, the embodiment will be specifically described below. In this embodiment, the X-axis deflection signal and the Y-axis deflection signal, which are used for indicating the tracking pattern, can be obtained by converting the output signals of the reversible counters RC-1 and RC-2 into analog signals through the digital-to-analog converters DA-1 and DA-2, respectively. Said reversible counters RC-1 and RC-2 are directly controlled by the sequence controller SC and pulses from clock A (refer to FIGURE 6b) applied via the terminal 51.

The sequence controller SC comprises, for instances, an appropriate combination of binary counters and gates utilizing conventional techniques. Further, said controller SC is provided with eight output terminals providing sequence control signals. Said sequence controller is actuated by pulses from clock B (refer to FIGURE 6c) applied via the terminal 52, to deliver the sequence control signals, as shown in lines (e) through (j) of FIGURE 6, successively to eight output terminals. For simplification, illustration as to the outputs from terminals 7 and 8 is omitted.

The tracking start pulse is applied to the set terminal S of the flip-flop circuit FF–1 through the terminal 53. Upon arrival of the start pulse, an output as shown in line (d) of FIGURE 6 is produced in the flip-flop FF–1. This state, as will be mentioned later, is held until the reset pulse arrives at the reset terminal R of said flip-flop. The output from the flip-flop FF–1 is applied to the AND gates $G_1$ and $G_2$. To the AND gate $G_1$, clock A is also applied through the terminal 51 in addition to the output of the flip-flop FF–1. At the AND gate $G_1$, clock A is inhibited by the output from No. 1, No. 3, No. 5, or No. 7 terminal of the sequence controller SC. On the other hand, to the AND gate $G_2$, clock B is applied through the terminal 52 in addition the output of the flip-flop FF–1. At the AND gate $G_2$, said clock B is inhibited by the output of the flip-flop FF–3.

For the reasons to be described later, at the moment the starting pulse is received at the terminal 53, the output of the flip-flop FF–3 is zero. Refer to line (s) of FIGURE 6. Therefore, clock B which is applied at the terminal 52 is applied to the sequence controller SC. The sequence controller has been reset at this moment, and no output is present at any terminal. The sequence controller SC is so constituted that it is to be started at the rising point of the first incoming clock pulse $B_a$ (FIGURE 6c) after arrival of the starting pulse. Accordingly, by clock pulse $B_a$, the output signal as shown in line (e) of FIGURE 6 is derived at the 1st terminal of said sequence controller.

This output signal is sent to the AND gate $G_1$ through the OR gate $G_3$, to inhibit application of pulses from clock A to reversible counter RC–1. At the same time, this signal is also applied to the reversible counter RC–1. This counter (details not illustrated) is set to —7 by the timing of clock pulse $A_a$ (FIGURE 6b). When the next clock pulse $B_b$ is received, the output of the 1st terminal of the sequence controller SC is reset to 0 and, at the same time, an output appears at the 2nd terminal (FIGURES 6e and 6f).

Thus, inhibition of the pulses from clock A at the AND gate $G_1$ is released, and clock A is connected to the reversible counter RC–1. On the other hand, said counter is set for the counting operation by the output signal of the 2nd terminal of the sequence controller SC. The counter thus counts the number of clock pulses from the terminal 51 during the period for which said signal exists. The counter then decreases its set number from —7 to 0. During said counting period, it is necessary not to change the condition of the sequence controller SC. For this, the output signal from the 2nd terminal of the sequence controller SC is applied to the AND gate $G_6$ through the OR gate $G_5$. While, clock pulses A from the terminal 51 are applied to the AND gate $G_6$ which, then, delivers the output at the timing of clock pulse $A_b$ (FIGURE 6b). Therefore, the flip-flop FF–3 is set by said output, and thereby, the output of this flip-flop is turned to 1. (Refer to FIGURE 6s.) This signal is applied to the AND gate $G_2$, which in turn inhibits passage of pulses from clock B. Accordingly, any pulse after the pulse $B_b$ is not sent to the sequence controller SC. Thus the condition of said sequence controller is held during a predetermined period (FIGURE 6f).

When the value on the reversible counter RC–1 reaches 0, a signal is applied to the terminal 54 as shown in the lower part of FIGURE 5. Details are not illustrated. This signal is applied to the AND gate $G_7$. Because pulses from clock B have been also applied to the AND gate $G_7$, as shown in the drawing, an output is provided at AND gate $G_7$, in accordance with the timing of clock $B_c$ (FIGURE 6c). Said output is applied to the reset terminal R of the flip-flop FF–3 to reset this flip-flop (FIGURE 6s).

As the result of having reset the flip-flop FF–3, the inhibition for pulses of clock B at the AND gate $G_2$ is released, and said clock pulse $B_c$ (FIGURE 6c) is also applied to the sequence controller SC. By this, the output of said controller is shifted by one terminal, and an output is derived at the 3rd terminal (FIGURE 6g). The output at the 3rd terminal is applied to the AND gate $G_1$ through the OR gate $G_4$, to inhibit clock A. Simultaneously with inhibiting clock pulse A, said signal is also sent to the reversible counter RC–1, to set said counter to +7 (details not illustrated) in accordance with the timing of clock pulse $A_c$ (FIGURE 6b). Furthermore, upon arrival of the next clock pulse $B_d$ (FIGURE 6c), the output of the sequence controller SC is shifted by one terminal, and an output appears at the 4th terminal (FIGURE 6h).

This output is applied to the reversible counter RC–1, and the counter is set for the counting operation. At the same time, part of the above output is applied to the AND gate $G_6$ through the OR gate $G_5$. Consequently, at the timing of clock pulse $A_d$, the flip-flop FF–3 is set again, and the output of said flip-flop inhibits clock B (FIGURES 6k and 6s).

For this reason, the sequence controller SC is held again. On the other hand, because the output of the 3rd terminal of said controller is turned to 0, inhibition of clock pulses A at the AND gate $G_1$ is released. Thus the reversible counter RC–1 starts counting.

When the reversible counter RC–1 turns 0 again (FIGURE 6k), the AND gate $G_7$ delivers an output at the receipt of clock pulse $B_e$, and this output resets the flip-flop FF–3 again. Accordingly, the inhibition of clock pulse B is released, and clock pulse $B_e$ is applied to the sequence controller SC. Thus, the output of said controller is shifted by one terminal, and the output is derived at the 5th terminal (FIGURES 6h and 6i). Consequently, controlling the reversible counter RC–1 by the sequence controller SC is completed and, in turn, the reversible counter RC–2 for Y-axis control is started by the continued control of the sequence controller SC.

The operation of the reversible counter RC–2 is the same as that of the reversible counter RC–1, excepting that RC–2 is controlled by the outputs of the 5th through 8th terminals of sequence controller SC. Therefore, details of the reversible counter RC–2 will not be described herein.

As the result of circuit operation described thus far, and when an output appears at the 8th terminal of the sequence controller SC, part of said output signal is sent to the AND gate $G_8$. As will be particularly described later, the signal indicating the completion of the track is given to this AND gate from the register R–4, By the timing of said signal, the sequence controller SC and the flip-flop FF–1 are reset.

During the operation period as mentioned above, the values in the reversible counters RC–1 and RC–2 are successively converted into analog signals by the digital-to-analog converters DA–1 and DA–2 respectively, and derived through the adders AD–1 and AD–2, for use as the X-axis deflection signal and the Y-axis deflection signal. Accordingly, in case the outputs of both digital-to-analog converters DA–3 and DA–4 shown at the right ends of the figure are 0, only the outputs of the adders AD–1 and AD–2 are applied to the CRT. Thus, the electron beam is controlled by said outputs, in such manner that the tracking patterns are traced in the horizontal and the vertical direction, with the center point of the display screen as the origin.

Under this condition, assume that the light-pen is positioned near the origin on the display screen of the CRT. As has been described in connection with the embodiment in FIGURES 3a through 3c wherein analog circuits are used, the light-pen produces an output pulse as shown FIGURE 6, line (l), at the time that the tracking patterns enter the sensitive field of the light-pen. For simplification, only the X-axis is explained. When the output pulse $LP_a$ of the light-pen is received through the terminal 55, the flip-flop FF-2 is set (FIGURE 6m), and its output is applied to the AND gates $G_9$ through $G_{12}$. Both gates $G_{11}$ and $G_{12}$ have no relation to this X-axis operation. Therefore, only the result of operation of gates $G_9$ and $G_{10}$ will be explained. The values of the reversible counter RC-1 are continually applied to the AND gates $G_9$ and $G_{10}$. Furthermore, to the AND gates $G_9$ and $G_{10}$, the outputs at the 2nd and the 4th terminals of the sequence controller SC are applied respectively as the gate control signals.

Accordingly, as obviously known from FIGURES 6k, 6l, and 6m, when the output $LP_a$ of the light-pen is received, the AND gate $G_9$ is selected, and the value $-4$ of the reversible counter RC-1 is applied to the register R-1. Therefore, said value is held in said register (FIGURE 6n). When the register R-1 holds the value of the reversible counter, said register generates a reset pulse (details not illustrated), and this pulse is sent to the flip-flop FF-2 through the OR gate $G_{13}$. Thus, FF-2 is reset (FIGURE 6m).

During presence of the next tracking pattern, the light-pen output $LP_b$ (FIGURE 6l) is received. In this case, the AND gate $G_{10}$ is selected, and the value $+2$ of the reversible counter RC-1 is stored in the register R-2. (Refer to FIGURES 6k, 6l, and 6o). While the output exists at the 5th terminal of the sequence controller SC, the values in both registers R-1 and R-2 are applied to the adder AD-3 (details not illustrated), and the computation of the Equation 1 as explained by referring to FIGURE 1 is executed (FIGURE 6p). The result of this computation represents the deviation along the X-axis, between both center positions of the tracking pattern and the light-pen and, therefore, said deviation value is stored in the register R-5 (FIGURE 6r). The value of the register R-5 is converted into an analog signal through the digital-to-analog converter DA-3, and then derived as the X-axis deflection signal through the adder AD-1. As a result, the electron beam in the CRT follows the center position of the light-pen.

Explanation about the Y-axis has been omitted here, because its operation is quite similar to that of the X-axis control.

In the next tracking cycle, the circuit is operated under the condition where the registers R-5 and R-6 hold the respective values which have been held during the preceding tracking cycle. If the registers R-5 and R-6 are made functionable to add or subtract the respective values of the adders AD-3 and AD-4 to or from the respective values stored in the registers R-5 and R-6, and to store the results, the values thus stored always represent the X- and Y-coordinates of the light-pen center. Consequently, the pen-tracking is continuously performed. Since the values of the registers R-5, R-6 and the adders AD-3, AD 4 are digital values, these values can be sent directly into the memory of the computer.

In the description given thus far, the generating system of the intensity control signal of CRT is omitted. However, those skilled in the art will easily become capable of constituting said system if desired. As to the first position of the tracking pattern, it is not always necessary to locate said position at the origin (i.e., center point) of the display screen of the CRT. By associating an appropriate means with the circuit, it becomes possible to shift the origin so that the tracking can be started from any point.

As has been described in detail, the tracking system of this invention needs, in principle, no program-control by the computer. Accordingly, the occupied time at the computer can be minimized or reduced to zero. This makes it possible to send information as to characters and figures to the computer at a high speed. According to the experimental results of this invention and others, the time needed for the tracking cycle in the case of this invention is about 100 to 200 microseconds, and it is confirmed that the tracking speed can be increased as high as 5 to 10 times the case where the conventional digital tracking cross is used.

Although only two embodiments of the present invention are shown and described herein, it will be understood that this application is intended to cover such changes and modifications as come within the spirit of the present invention or scope of the following claims.

What is claimed is:

1. A pen-tracking system for use in combination with a cathode-ray tube display system which includes a cathode-ray tube and horizontal and vertical deflection means for effecting coordinate deflection of the cathode-ray beam comprising
   a light-pen generating a control signal in response to detection of a light spot within a sensitive range thereof;
   first coordinate valve holding means for storing the coordinate valve of the position of said light-pen on the face of said cathode-ray tube;
   deflection means for generating respective coordinate deflection signals deflecting said cathode-ray beam along respective orthogonal tracks forming a cross-shaped tracking pattern extending from positions outside of the sensitive range of said light-pen and moving to the position of said light-pen stored in said first coordinate value holding means;
   second coordinate value holding means for storing the respective coordinate values of the light spot of said cathode-ray beam moving along said tracks at the points of entry thereof into said sensitive range as determined by generation of control signals by said light-pen at these points of entry;
   coordinate determining means for determining the coordinate value of the position of said light-pen from the respective coordinate values stored in said second coordinate value holding means; and
   adjusting means for continuously replacing the position coordinate value in said first coordinate value holding means with the data provided by said coordinate determining means.

2. A pen-tracking system as defined in claim 1 and further including timing means for enabling said first and said second coordinate value holding means, said deflection control means and said coordinate determining means only in predetermined time slots of a repetitive time frame.

3. A pen-tracking system as defined in claim 2 wherein the coordinate value stored in said first coordinate value holding means is applied to said deflection means in a given time slot of the repetitive time frame to effect a tracking of said light-pen by the cathode-ray beam.

4. A pen-tracking system as defined in claim 2 wherein said deflection control means includes first and second pairs of switch means responsive to said timing means for applying said coordinate deflection signals to said deflection means in respective halves of said repetitive time frame.

5. A pen-tracking system as defined in claim 4 wherein each of said first and second pairs of switch means includes first and second switch means responsive to respective signals of opposite polarity for generating deflection signals deflecting said beam during successive time periods in opposite directions to points outside the sensitive range of said light-pen and back to the initial position thereof along a line passing through the position of said light-pen stored in said first coordinate value holding means.

6. A pen-tracking system as defined in claim 5 wherein the line of deflection of said beam effected by said first pair of switch means is transverse to the line of deflection of said beam effected by said second pair of switch means.

7. A pen-tracking system as defined in claim 5 wherein said deflection signals consist of a first portion for deflecting the beam outwardly from the initial position thereof and a second portion for deflecting the beam back to its initial position, said first and second portions occurring in successive time slots of the repetitive time frame, said deflection control means further including intensity control means for cutting-off said beam during the first portions of said deflection signals.

8. A pen-tracking system as defined in claim 5 wherein said second coordinate value holding means includes first and second pairs of storage devices for storing the respective pairs of values of said deflection signals at the points of entry of said beam into the sensitive range of said light-pen.

9. A pen-tracking system as defined in claim 8 further including gating means for connecting the output of said deflection control means to said second coordinate value holding means in response to receipt of a control signal by said light-pen to thereby store in said holding means the values of the deflection signal at the points of entry of said beam into the sensitive range of said light-pen.

10. A pen-tracking system as defined in claim 9 wherein the sensitive range of said light-pen is a circular detection pattern and said coordinate determining means includes first and second adder means for adding the respective coordinate values of the light spot of said beam moving along said tracking pattern as stored in said second coordinate value holding means and first and second divider means connected to said respective first and second adder means for dividing the magnitude of the output thereof in half to determine the center of said circular detection patterns in each coordinate direction.

11. A pen-tracking system as defined in claim 1 wherein said deflection control means includes first and second systems for respectively controlling X and Y axis deflection of the beam, a first source of clock pulses connected in each system to a reversible counter whose period is equal to the respective scanning period of the deflection means and first converter means for converting the count of said reversible counter to a beam deflection signal.

12. A pen-tracking system as defined in claim 11 and further including a second source of clock pulses connected to sequence controller means for controlling the operation of the reversible counter in each of said first and second systems in accordance with a timed sequence.

13. A pen-tracking system as defined in claim 12 and further including first gating means for connecting the outputs of said reversible counters to said second coordinate value holding means in response to receipt of a control signal from said light-pen to thereby store in said holding means the values representative of the points of entry of said beam into the sensitive range of said light-pen.

14. A pen-tracking system as defined in claim 13 wherein said sequence controller means includes setting means for setting said respective reversible counters sequentially to values representative of deflected positions of said beam outside of the sensitive range of said light-pen on respective transverse lines passing through the beam position stored in said first coordinate value holding means.

15. A pen-tracking system as defined in claim 14 wherein said sequence controller means further includes second gating means for connecting said counters to said first source of clock pulses after each setting of the counter by said setting means.

16. A pen-tracking system as defined in claim 15 wherein the sensitive range of said light-pen is a circular detection pattern and said coordinate determining means includes first and second adder means for adding the respective coordinate values of the light spot of said beam moving along said tracking pattern as stored in said second coordinate value holding means.

17. A pen-tracking system in cathode-ray tube display equipment, comprising:
first coordinate value holding means for storing the coordinate value of the center position of a light-pen on the face of the cathode-ray tube;
means for generating two tracking patterns on the face of the cathode-ray tube with the beam thereof, wherein the center position of said light-pen before movement thereof as stored in said first coordinate value holding means is taken as the reference point including means for deflecting said beam rectilinearly toward said reference point from two tracking start positions located at a definite distance from said reference point in a direction opposite to each other along the same line;
with respect to each of said tracking patterns, second coordinate value holding means for storing the coordinate value of the bright spot formed by the beam of the cathode-ray tube when said bright spot enters the sensitive field of said light-pen;
means for adding the coordinate values stored by said second coordinate value holding means; and
means for renewing the value held by said first coordinate value holding means, according to the result of said addition.

18. A pen-tracking system in accordance with claim 17 in which the value of the deflection signal for the beam of the cathode-ray tube is held as the coordinate value of said bright spot by said second coordinate value holding means when said bright spot enters into the sensitive field of said light-pen.

19. A pen-tracking system in accordance with claim 17 in which the position of the bright spot at the moment said bright spot enters the sensitive field of said light-pen is held in terms of the coordinate value with said reference point as the origin, by said second coordinate value holding means.

20. A pen-tracking system in cathode-ray tube display equipment, comprising
first coordinate value holding means for storing the coordinate value of the center position of a light-pen on the face of the cathode-ray tube;
means for generating two tracking patterns on the face of the cathode-ray tube with the beam thereof consisting of a time delay circuit, means for applying positive and negative reference voltages in succession to said time delay circuit, and means for deriving the output of said time delay circuit as the deflection signal for a cathode-ray tube, wherein the center position of a light-pen before movement thereof as stored in said first coordinate value holding means is taken as the reference point including means for deflecting said beam rectilinearly toward said reference point from two tracking start positions located at a definite distance from said reference point in a direction opposite to each other along the same line;
with respect to each of said tracking patterns, second coordinate value holding means in which the value of the deflection signal for a cathode-ray tube at the moment said bright spot enters into the sensitive field of said light-pen is stored as the coordinate value of the beam forming the bright spot;
means for adding the coordinate values stored by said second coordinate value holding means; and
means for renewing the valve held by said first coordinate value holding means, according to the result of said addition.

21. A pen-tracking system in cathode-ray tube display equipment, comprising
first coordinate value holding means for storing the coordinate value of the center position of a light-pen on the face of the cathode-ray tube;
means for generating signals the values of which are changed from initial values to zero, said initial values corresponding to the coordinate values of two tracking start points located on the same line at a definite distance from each other in opposite directions from a reference point on the face of the cathode-ray tube;

with respect to each of said tracking patterns, second coordinate value holding means for storing the signal value from said signal generating means generated at the moment said bright spot formed by said beam enters the sensitive field of said light-pen;

means for adding the signal values held by said second coordinate value holding means so that the deviation value between said origin and the light-pen center after movement thereof is obtained; and means for renewing the value of said first coordinate value holding means, according to the result of said addition.

References Cited

UNITED STATES PATENTS

| | | | |
|---|---|---|---|
| 3,256,516 | 6/1966 | Melia et al. | 340—172.5 |
| 3,337,860 | 8/1967 | O'Hara | 340—324 |

OTHER REFERENCES

IBM Technical Disclosure Bulletin, CRT Display With Pen Tracking, G. C. Rarda, vol. 5, No. 2, July 1962 (pp. 40–42).

R. D. BENNETT, JR., Primary Examiner

J. P. MORRIS, Assistant Examiner

U.S. Cl. X.R.

340—324